(12) United States Patent
Wiegner et al.

(10) Patent No.: US 11,546,037 B2
(45) Date of Patent: Jan. 3, 2023

(54) HETEROGENEOUSLY EQUIPPED MULTI ANTENNA SYSTEM AND METHOD OF OPERATING SUCH SYSTEM

(71) Applicant: Nokia Technologies Oy, Espoo (FI)

(72) Inventors: Dirk Wiegner, Schwaikheim (DE); George Hotopan, Stuttgart (DE)

(73) Assignee: Nokia Technologies OY, Espoo (FI)

( * ) Notice: Subject to any disclaimer, the term of this patent is extended or adjusted under 35 U.S.C. 154(b) by 55 days.

(21) Appl. No.: 16/151,751

(22) Filed: Oct. 4, 2018

(65) Prior Publication Data

US 2019/0109630 A1 Apr. 11, 2019

(30) Foreign Application Priority Data

Oct. 5, 2017 (EP) ..................................... 17194958

(51) Int. Cl.
*H04B 7/06* (2006.01)
*H04B 7/12* (2006.01)
*H04B 7/0452* (2017.01)

(52) U.S. Cl.
CPC ......... *H04B 7/0691* (2013.01); *H04B 7/0452* (2013.01); *H04B 7/0604* (2013.01); *H04B 7/12* (2013.01)

(58) Field of Classification Search
CPC .. H04B 7/0691; H04B 7/0452; H04B 7/0604; H04B 7/12; H04B 7/0608; H04B 7/0617; H04B 7/0426; H04B 7/0413; H01Q 3/00; H01Q 25/00; H01Q 1/00; H01Q 5/00
See application file for complete search history.

(56) References Cited

U.S. PATENT DOCUMENTS

| 6,430,421 | B1 | 8/2002 | Kiiski et al. |
| 2006/0250182 | A1 | 11/2006 | Takeda et al. |
| 2008/0063116 | A1 | 3/2008 | Yokoyama |
| 2013/0241800 | A1 | 9/2013 | Schlub et al. |
| 2014/0148107 | A1 | 5/2014 | Maltsev et al. |
| 2015/0071192 | A1 | 3/2015 | Moilanen et al. |

(Continued)

FOREIGN PATENT DOCUMENTS

| CN | 101147334 A | 3/2008 |
| CN | 202490997 A | 7/2009 |

(Continued)

OTHER PUBLICATIONS

Chinese Search Report issued in related Chinese Patent Application No. 201811134394.4 dated Nov. 18, 2020, 3 pages.

*Primary Examiner* — Chi H Pham
*Assistant Examiner* — Ji-Hae Yea
(74) *Attorney, Agent, or Firm* — Fay Sharpe LLP

(57) ABSTRACT

A multi antenna system, comprising a plurality of transceivers for an antenna array operable for communication with wireless terminals, wherein the multi antenna system comprises a radio controller, adapted to operate a first transceiver for radio communication within a first bandwidth, wherein the first transceiver is limited by hardware to radio communication within the first bandwidth, a second transceiver adapted for radio communication within a second bandwidth selectable from a plurality of bandwidths, a radio controller adapted to operate, depending on a data rate demand, either the first transceiver or the second transceiver or both for radio communication.

20 Claims, 5 Drawing Sheets

(56) References Cited

U.S. PATENT DOCUMENTS

| | | | |
|---|---|---|---|
| 2015/0103663 A1 | 4/2015 | Amini et al. | |
| 2015/0117368 A1 | 4/2015 | Barriac et al. | |
| 2016/0204809 A1* | 7/2016 | Pratt | H04B 1/04 |
| | | | 375/219 |
| 2016/0211898 A1* | 7/2016 | Cai | H04B 7/0617 |

FOREIGN PATENT DOCUMENTS

| | | |
|---|---|---|
| CN | 102739580 A | 10/2012 |
| CN | 204205485 A | 12/2014 |
| CN | 204717698 A | 6/2015 |
| CN | 105122664 A | 12/2015 |
| CN | 205812015 A | 7/2016 |
| EP | 1995879 A1 | 11/2008 |
| JP | 2002-519909 A | 7/2002 |
| JP | 2006-295282 A | 10/2006 |
| JP | 2016-541165 A | 12/2008 |
| JP | 2011-193519 | 9/2011 |
| WO | WO 2006/103758 | 9/2008 |
| WO | WO 2016/173633 A1 | 11/2016 |
| WO | WO-2016173633 A1 * | 11/2016 ........... H04B 7/0408 |

* cited by examiner

Fig. 2

HETEROGENEOUSLY EQUIPPED MULTI ANTENNA SYSTEM AND METHOD OF OPERATING SUCH SYSTEM

FIELD OF THE INVENTION

The invention concerns a heterogeneously equipped multi antenna system, in particular a massive multiple input and multiple output (MMIMO) system and method of operating such system.

BACKGROUND

Wireless access systems provide radio communication to wireless terminals via radio links.

MMIMO in the context of radio communication refers to multiplying the capacity of a radio link using multiple transmit and receive antennas of the wireless access system and to control transceivers for spatial multiplexing using the multiple transmit and receive antennas in a radio communication within the same frequency band with one or more wireless terminals. In this wireless access system many more antennas are used than wireless terminals connected to the wireless access system.

In MMIMO, due to the spatial multiplexing, a data throughput per user is however limited for each wireless terminal alike.

Beamforming for directional signal transmission to an individual wireless terminal or reception therefrom may be used in wireless access systems as well to improve the data throughput for an individual wireless terminal.

Beamforming in this context relates to controlling a phase and relative amplitude of a plurality of signals within the same frequency band, in order to create a pattern of constructive and destructive interference in such a way that signals form a spatial selective beam.

This increases the data throughput for individual wireless terminals but restricts the data throughput of others. It is an objective of the present invention to provide a wireless access system and a method of operating the wireless access system having improved data throughput capabilities with reasonable equipment cost and reasonable design effort.

SUMMARY OF THE INVENTION

This objective is achieved by a multi antenna system and a method of operating such system according to the independent claims.

In the context of this application

Signal/carrier bandwidth refers to an actual bandwidth of a signal to be transmitted and is flexible during operation. It is among others limited to maximum hardware bandwidth capabilities of a transceiver of the multi antenna system. A center frequency of the signal bandwidth is flexible also during operation, depending on the hardware limitations. This signal bandwidth directly affects the actual transmitted data rates.

Hardware related bandwidth of a first transceiver refers to a maximum bandwidth supported by the first transceiver. This bandwidth is hardware defined and fixed during transceiver design and realization.

Hardware related bandwidth of a second transceiver refers to a maximum bandwidth supported by the second transceiver. This bandwidth is hardware defined and fixed during transceiver design and realization. Within a bandwidth in this context refers to an operation with at least a fraction of the respective bandwidth.

In an example, when the hardware related bandwidth of the second transceiver is larger than the bandwidth of the first transceiver, the hardware of the second transceiver is more complex and costly.

The hardware related bandwidth of the second transceiver could cover aggregated frequency bands, which means that the frequency bands covered by the second transceiver not necessarily have to be directly adjacent. For example, two frequency bands of e.g. 60 MHz each can be aggregated within e.g. 400 MHz. Within this 60 MHz, each, different signal bandwidths can be flexibly transmitted.

The present invention provides a method of operating a multi antenna system, wherein the multi antenna system comprises a plurality of transceivers arranged with an antenna array for communication with a plurality of wireless terminals, the multi antenna system comprising a first transceiver for radio communication within a single first bandwidth, wherein the first transceiver is limited by hardware to radio communication within the single first bandwidth, a second transceiver for radio communication within a second bandwidth selectable from a plurality of bandwidths, the method comprising operating, depending on a data rate demand, either the first transceiver or the second transceiver or both for radio communication. Preferably the first bandwidth is a low-bandwidth with respect to the second bandwidth. Preferably the second bandwidth is a high or wide bandwidth compared to the first bandwidth. Optionally the second transceiver operates for radio communication within the second bandwidth during a time interval at least partially overlapping with operating the first transceiver within the first bandwidth. The first transceivers are limited by hardware to the low bandwidth. This makes the first transceivers cheaper in production, less complex in design and characterization or for putting into operation. The second transceivers are capable of operating in various bandwidths fully independent from or including but not limited to the first bandwidth and the second bandwidth. This makes the second transceivers more costly but also more powerful. The antenna array is heterogeneously equipped with the different transceivers providing the different bandwidth capabilities. This makes the antenna array less costly, less complex and provides a flexible MMIMO system, while still having the possibility to provide high data rates within the restrictions of the heterogeneous equipment, if required. The wireless terminals may have different data rate demands. The data throughput, i.e. the maximum amount of data that can be sent or received by the antenna array or the wireless terminal in a certain amount of time, depends on the frequency band used and is thereby limited. Frequency band in this context refers to the total standardized frequency band which is separated in different carriers with specific bandwidths for different operators. Within the standardized frequency bands there is flexibility in carrier bandwidth. Assigning the larger second bandwidth to all wireless terminals will give all wireless terminals the same high individual data throughput and will improve individual data rates. Equipping the antenna system e.g. fully with these high bandwidth transceivers compared to a heterogeneously equipped multi antenna system will increase the cost of such system. Assigning the lower first data rate to all wireless terminals limits the individual data throughput for all wireless terminals to the maximum data throughput achievable with the first bandwidth. This includes those wireless terminals that would presently require the larger second data rate for best operation. Assigning to different transceivers of the same antenna array different data rates allows adjusting the individual data throughput, making most efficient use of the available data throughput of the antenna array.

Advantageously, information about the data rate demand is determined or analyzed for a wireless terminal, and either the first transceiver or the second transceiver is or both are selected for radio communication with the wireless terminal depending on information about the data rate demand. This allows data rate dependent adjustment to improve flexibility. Likewise, a terminal requiring low to medium data rates may communicate with all transceivers for the lower bandwidth, e.g., in massive MIMO operation if, e.g., the first bandwidth and the second bandwidth overlap.

Advantageously, the first bandwidth is equal to or less than one of the group of 20MHz, 50MHz, 60MHz, and the second bandwidth is equal to or less than one of the group of 10 MHz, 20 MHz, 50 MHz, 60 MHz, 100MHz, 150MHz, 200MHz. The first group of bandwidths provides sufficient data throughput for conventional use. The second group of bandwidths provides sufficient data throughput for high data rate demand. The idea is to equip the setup with at least two groups of transceivers with different bandwidth capabilities: the first group of transceivers covers e.g. only one frequency band with up to maximum 60 MHz bandwidth while the second group of transceivers covers the same frequency band as the first group and additional frequency bands to extend the total supported bandwidth of the second group of transceivers. This is just one example, different number of transceiver groups and configurations are possible. In order to increase the maximum supported bandwidth, e.g. frequency band aggregation can be used, since usually radio frequency bands especially below 6 GHz are clearly bandwidth limited.

Advantageously, at least two transceivers of the plurality of transceivers operate to control a beamforming radio communication. Beamforming may increase the individual data throughput for certain situations instead or additionally to using MMIMO techniques. For beamforming, at least two transceivers are required, but more transceivers may be used. All transceivers for example operate in MMIMO operation at a common limited frequency range in order to serve the wireless terminals demanding less data rate. The wide bandwidth capable second transceivers additionally use bandwidth for beamforming or MMIMO providing higher data rates to the more wireless terminals demanding higher data rate.

Advantageously, the beamforming radio communication is controlled within the second bandwidth with a wireless terminal or a relay, if the information about the data rate demand for this wireless terminal or a group of wireless terminals meets a requirement condition. For very high data rate demand, this beamforming and the second bandwidth may be used for individual wireless terminals.

Advantageously, at least one transceiver of the plurality of transceivers selectively operates for radio communication within the first bandwidth with a first adjustable supply voltage for a power amplifier of the at least one transceiver, or for radio communication within the second bandwidth with a second adjustable supply voltage for the power amplifier. This flexibly adapts power consumption to the data rate demand.

Advantageously, the at least one transceiver of the plurality of transceivers is selected for operation within the second bandwidth depending on a connectivity parameter. The connectivity parameter may be indicative of a line-of-sight or non-line-of-sight radio link for a radio communication with a wireless terminal. This allows adjusting the radio communication based on the environment the wireless terminal and the antenna array operate in momentarily.

Advantageously, at least one second transceiver operates temporarily for radio communication within the first bandwidth. This means that this second transceiver can operate in both frequency bands on demand. Such transceiver may be more costly but is also more flexibly usable.

Advantageously, the antenna array, the plurality of transceivers and a controller for the plurality of transceivers operate as a massive multiple input multiple output system within a common bandwidth.

The present invention further provides a multi antenna system, comprising a plurality of transceivers for an antenna array operable for communication with wireless terminals, wherein the multi antenna system comprises a radio controller, a first transceiver for radio communication within a single first bandwidth, wherein the first transceiver is limited by hardware to radio communication within the single first bandwidth, and a second transceiver adapted for radio communication within a second bandwidth selectable from a plurality of bandwidths, and wherein the radio controller is adapted to operate, depending on a data rate demand, either the first transceiver or the second transceiver or both for radio communication.

Advantageously, the radio controller is adapted to determine or analyze information about the data rate demand for a wireless terminal, and to select either the first transceiver or the second transceiver or both for radio communication with the wireless terminal depending on information about the data rate demand. Such radio controller measures the current data rate demands to improve the efficient use of the available data throughput of the antenna array.

Advantageously, the radio controller is adapted to operate with the first bandwidth being equal to or less than one of the group of 20 MHz, 50 MHz, 60 MHz and with the second bandwidth being equal to or less than one of the group of 10 MHz, 20 MHz, 50 MHz, 60 MHz, 100 MHz, 150 MHz, 200 MHz. The first group of bandwidths provides sufficient data throughput for conventional use. The second group of bandwidths provides sufficient data throughput for high data rate demand.

Advantageously, the radio controller is adapted to operate at least two transceivers of the plurality of transceivers to control a beamforming radio communication. The radio controller may increase the performance for an individual terminal or a group of wireless terminals this way.

Advantageously, the radio controller is adapted to control the beamforming radio communication within the second bandwidth with a wireless terminal of the plurality of wireless terminals or a relay, if the information about the data rate demand for this wireless terminal or a group of wireless terminals meets a requirement condition. The radio controller may increase the performance for an individual wireless terminal or group of terminals under certain conditions, including but not limited to available data throughput, demanded data rate, power availability, load of other transceivers.

Advantageously, the system is operable to adapt a supply voltage to different transceivers depending on a currently transmitted carrier bandwidth. This allows adjusting power consumption selectively.

Advantageously, the radio controller is adapted to select at least one transceiver of the plurality of transceivers for operation within the second bandwidth depending on a connectivity parameter. The radio controller may adjust this way to the environmental conditions.

Advantageously, at least one second transceiver is adapted to operate temporarily for radio communication within the first bandwidth.

Advantageously, the antenna array, the plurality of transceivers and the radio controller are arranged as a massive multiple input multiple output system within a common bandwidth.

Preferably, in a method of calibrating such system at least two transceivers are operated for beamforming radio communication, or wherein at least two transceivers are operated for massive multiple input multiple output radio communication, or wherein at least two transceivers are operated for beamforming radio communication and wherein at least two transceivers are operated for massive multiple input multiple output radio communication, wherein calibration or channel measurements are done using the transceivers within the first bandwidth or the second bandwidth.

Further developments of the invention can be gathered from the dependent claims and the following description.

BRIEF DESCRIPTION OF THE FIGURES

FIG. 2 schematically depicts a first exemplary bandwidth distribution in the antenna array from a hardware capability perspective, FIG. 3 schematically depicts a second exemplary bandwidth distribution in the antenna array, configured for low bandwidth radio communication FIG. 4 schematically depicts the first exemplary bandwidth distribution in the antenna array configured for low and high bandwidth radio communication, FIG. 5 schematically depicts a flowchart describing a flexible operation of the antenna array.

DESCRIPTION OF THE EMBODIMENTS

Figure 1:
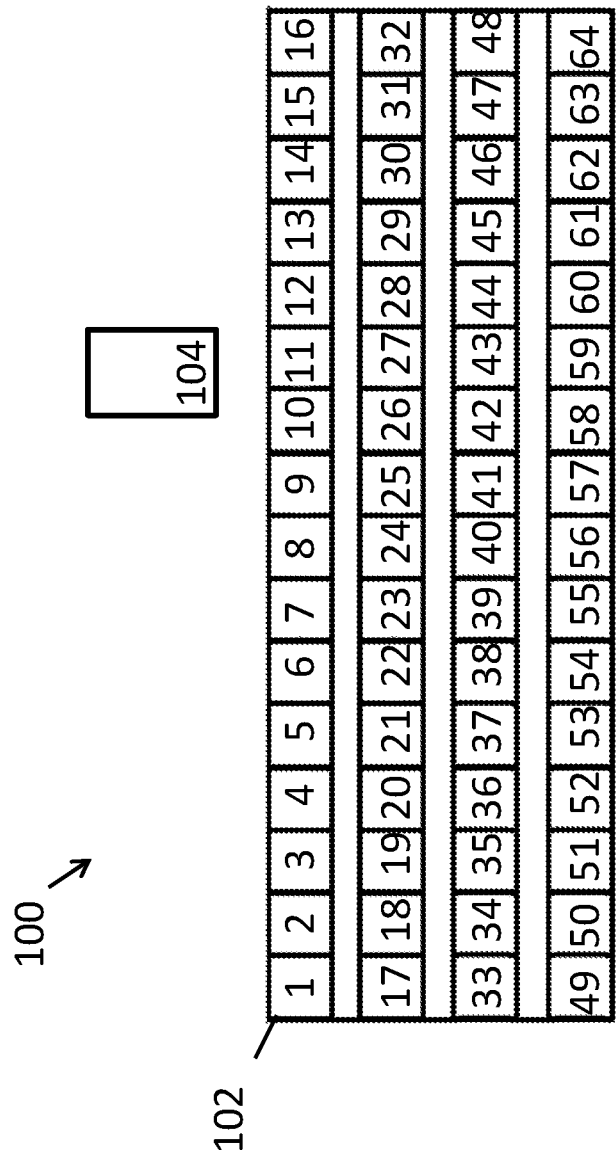
FIG. 1 schematically depicts an antenna array of a wireless access system.

FIG. 1 schematically depicts an antenna array 102 of a wireless access system 100. The antenna array 102 comprises a plurality of transceivers, in the example 64 transceivers 1, ..., 64.

Each of the plurality of transceivers is operable for communication with a plurality of wireless terminals.

The wireless access system 100 comprises a radio controller 104. In the example the antenna array 102, the plurality of transceivers 1, ..., 64 and the radio controller 104 are arranged as a massive multiple input multiple outputs, MMIMO, system. A MMIMO system in this context is a system that utilizes a large number, e.g. 64 or more, of individually controllable antenna elements at least at one side of a wireless communications link, typically at a Base Station. Each antenna element comprises in the example an individual transceiver. The radio controller 104 in the example is integrated in the Base Station to control all antenna elements of the base station.

The radio controller 104 is adapted to operate a first transceiver of the plurality of transceivers 1, ..., 64 for radio communication within a first bandwidth. The radio controller 104 is adapted to operate a second transceiver of the plurality of transceivers 1, ..., 64 for radio communication within a second bandwidth. This operation occurs in the example during at least partially overlapping time intervals, i.e. heterogeneously. The wireless access system 100 is thus a heterogeneously equipped MMIMO system. Heterogeneously in this context refers to this kind of operation. The wireless system that is capable of this kind of operation is referred to as a heterogeneously equipped MMIMO system.

The first bandwidth in the example may be smaller than the second bandwidth, overlapping with the second bandwidth or may be different than the second bandwidth.

The first transceiver is limited by hardware to radio communication within the first bandwidth. The second transceiver is adapted for radio communication within a plurality of bandwidths, including the second bandwidth.

The radio controller 104 is adapted for selecting, depending on a data rate demand, the second bandwidth from the plurality of bandwidths.

The radio controller 104 preferably is adapted to operate with the first bandwidth being equal to or less than one of the group of 20 MHz, 50 MHz, 60 MHz and with the second bandwidth being smaller, equal to or more than one of the group of 20 MHz, 50 MHz, 100 MHz, 150 MHz, 200 MHz. Other bandwidth may be used as well.

Figure 2:
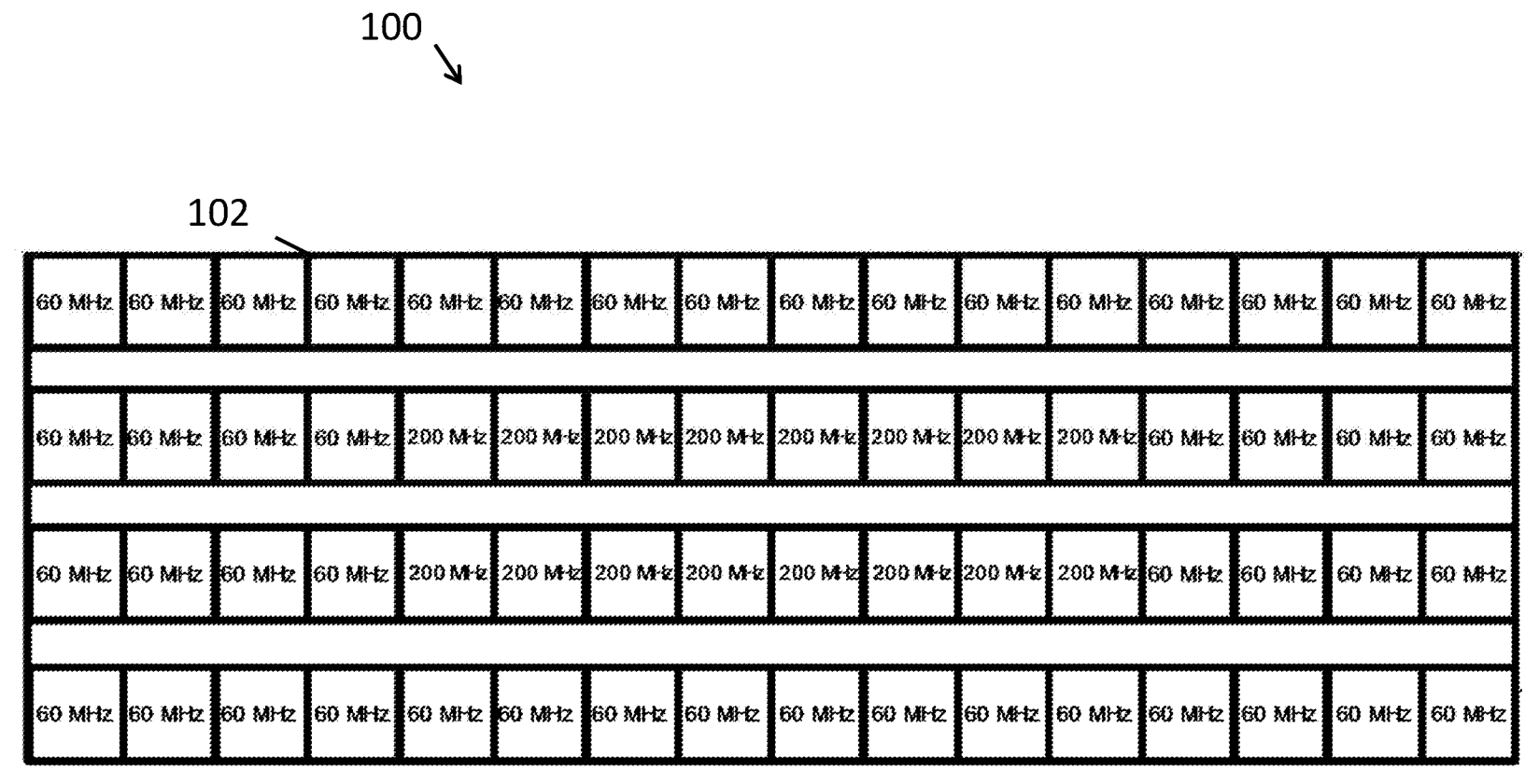

FIG. 2 schematically depicts a first exemplary bandwidth distribution in the antenna array of FIG. 1 configured for heterogeneous MIMO using as the first bandwidth 60 MHz and as the second bandwidth 200 MHz. This configuration is also given by equipping transceiver hardware with different bandwidth capabilities, in order to achieve reasonable cost and complexity. When only looking at the bandwidth distribution, this could also be achieved by equipping the whole system with high bandwidth transceivers. But this would require more costly and complex transceivers, and configuring some of them for high bandwidth and some of them for low bandwidth. The upper and lower frequency channel limits depend on the selected frequency bands to be covered and the currently used signal bandwidth and signal positioning in the bands. This is defined by application and hardware before deployment. For millimeter waves this is for example between 20-60 GHz or 30-300 GHz depending on the definition. In an example the system operates below six GHz, but it can be extended to higher frequencies, which puts then more limitation on applicability of non-line-of-sight situations and massive MIMO.

In the exemplary bandwidth distribution, the first transceivers are the transceivers referenced by 1 to 20, 29 to 36 and 45 to 64 in FIG. 1. The second transceivers according to this exemplary bandwidth distribution are referenced by 21 to 28, and 37 to 44.

The bandwidth distribution may be different.

Advantageously, at least one second transceiver 21 to 28, and 37 to 44 is adapted to operate temporarily for radio communication within the first bandwidth. This means that at least one transceiver of the plurality of transceivers 1, ..., 64 is adapted to operate either for radio communication within the first bandwidth or within the second bandwidth selectively or at the same time.

The radio controller 104 is adapted in this example, to selectively operate these transceivers either within the 60 MHz or within the 200 MHz bandwidth.

The system is in one example operable to adapt a power amplifier supply voltage to different transceivers depending on a currently transmitted carrier bandwidth.

The radio controller 104 may be adapted to operate at least one transceiver of the plurality of transceivers to control a beamforming radio communication by creating a pattern of constructive and destructive interference of radio signals. Beamforming may for example additionally or alternatively be used to MMIMO spatial multiplexing operation.

Figure 3:
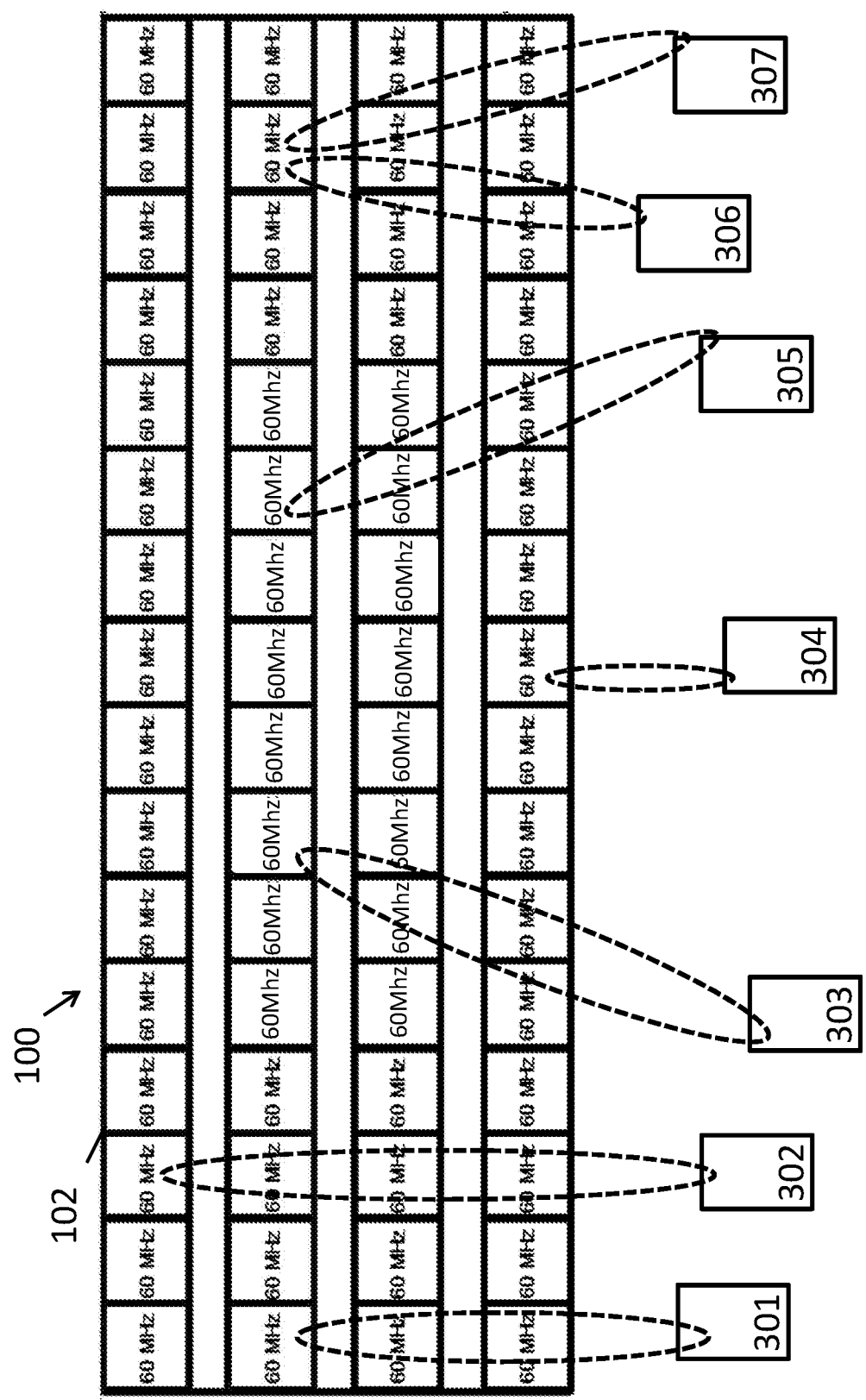

FIG. 3 schematically depicts the antenna array 102 of FIG. 1 and a plurality of wireless terminals 301, ..., 307 that are connected wirelessly to the antenna array 102.

In FIG. 3 a second exemplary bandwidth distribution is depicted for the antenna array 102 of FIG. 1. In the second exemplary bandwidth distribution, all transceivers 1, ..., 64 are configured for low bandwidth radio communication, e.g. within the 60 MHz bandwidth with all of the plurality of wireless terminals 301, ..., 307. The radio controller 104 operates all of the transceivers 1, ..., 64 within the first bandwidth of e.g. 60 MHz.

Figure 4:
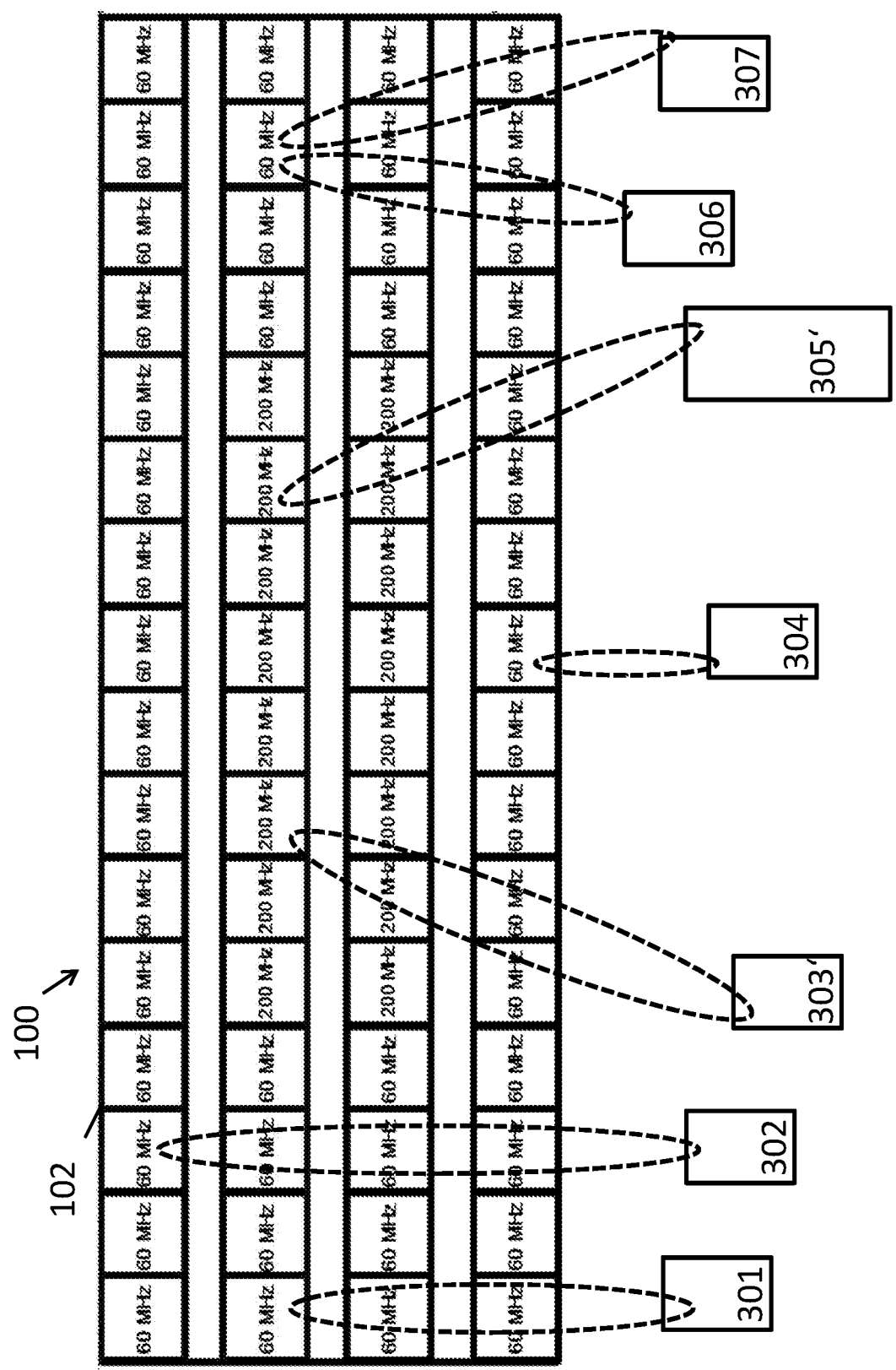

FIG. 4 schematically depicts the first exemplary bandwidth distribution in the antenna array 102 of FIG. 1. In this exemplary bandwidth distribution, the antenna array 102 is configured for low bandwidth radio communication with a majority of connected wireless terminals 301, 302, 304, 306, 307 and for high bandwidth radio communication, e.g. within 200 MHz with a minority 303', 305' of the plurality of wireless terminals. The radio controller 104 operates all first transceivers 1 to 20, 29 to 36 and 45 to 64 in the first exemplary bandwidth distribution within 60 MHz as the first bandwidth. The second transceivers 21 to 28, and 37 to 44 according to this first exemplary bandwidth distribution are operated within 200 MHz as the second bandwidth. The minority of wireless terminals 303' and 305' is for example a smartphone or a small cell in a fronthaul connection. The fronthaul connection may use one relay or more relays. Fronthaul in this context refers to a type of Radio Access Network, RAN, architecture consisting of centralized baseband controllers and standalone radio heads installed at remote cell sites located hundreds of meters to kilometres away from the baseband controllers.

Figure 5:
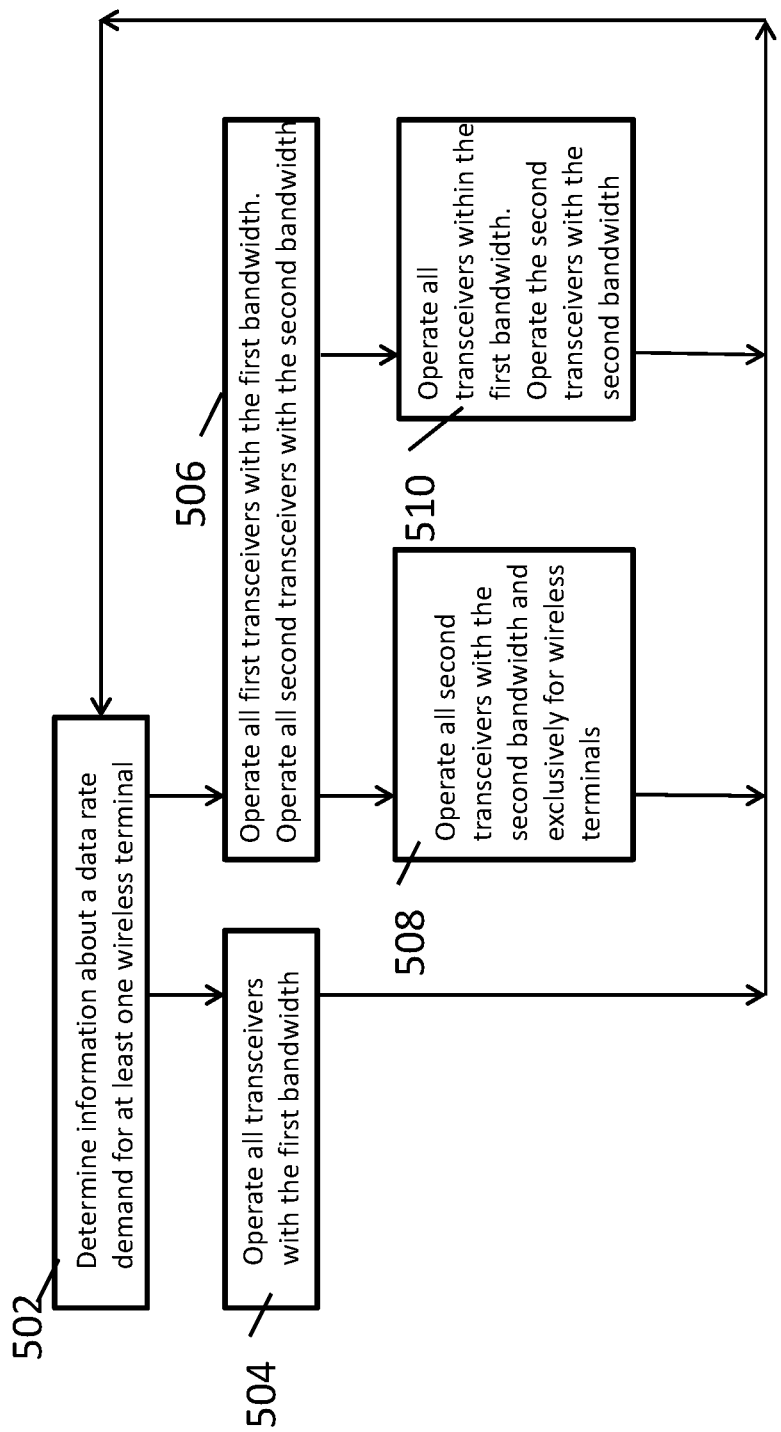

FIG. 5 schematically depicts a flowchart describing a flexible operation of the antenna array 102 of FIG. 1.

The radio controller 104 is adapted to operate the antenna array 102 according to the method described referencing FIG. 5.

In a step 502, information about a data rate demand for at least one wireless terminal of the plurality of wireless terminals is determined. Preferably the data rate demand for all connected wireless terminals is continuously monitored. The data rate demand may be indicated within a base station to terminal communication.

Calibration/channel measurements may also be done by separately calibrating/measuring connections of the first transceivers 1 to 20, 29 to 36 and 45 to 64 within the first bandwidth. In this case calibrating/measuring connections of the second transceivers 21 to 28, and 37 to 44 in the second bandwidth is done separately.

Calibration/measurement of all transceivers 1, ..., 64 may be done by calibrating/measuring connections of all transceivers within the first bandwidth and additionally calibrating/measuring connections of second transceivers 21 to 28, and 37 to 44 within the second bandwidth.

Preferably, at least two transceivers are operated for beamforming radio communication, at least two transceivers are operated for massive multiple input multiple output radio communication, or at least two transceivers are operated for beamforming radio communication and at least two transceivers are operated for massive multiple input multiple output radio communication. Then calibration or channel measurements are done using these transceivers within the first bandwidth or the second bandwidth.

Depending on the information about the data rates, different sets of antenna of the antenna array may be determined to use the first bandwidth or the second bandwidth.

If only low to medium data rates are required, a step 504 is executed. If at least one wireless terminal requires a high data rate, a step 506 is executed. More specifically, a plurality of data rate demands is determined for the plurality of wireless terminals. In particular, the step 504 is executed when all data rate demands of the plurality of data rate demands is below a threshold. Threshold could e.g. be an indication, which data rates can from data rate perspective be handled with the low bandwidth. In the example for best user experience, the step 504 is executed only if all data rate demands are below the threshold. In specific situations, step 504 may be executed at least temporarily when one or more data rate demand of the plurality data rate demands is equal to or more than the threshold. For example, step 504 may be executed while at least a majority of the plurality of data rate demands is less than the threshold. This avoids temporarily switching of sets of antenna.

In step 504, all transceivers of the plurality of transceivers 1, ..., 64 are operated with the first bandwidth. In particular all first transceivers 1 to 20, 29 to 36 and 45 to 64 operate within 60 MHz as the first bandwidth. In particular all second transceivers 21 to 28, and 37 to 44 are operated to use within first bandwidth 60 MHz.

In the step 504 the second transceivers 21 to 28, and 37 to 44 of the antenna array 102 may be configured for maximum up to 60 MHz operation, and all transceivers 1, ..., 64 of the antenna array 102 provide the same limited bandwidth e.g. to all users (MMIMO principle). The same bandwidth may be provided with beams using beamforming e.g. in line-of-sight connectivity as well. In general there are several possibilities: Either each second transceiver 21 to 28, and 37 to 44 uses up to 60 MHz, which is the same frequency range as all the first transceivers 1 to 20, 29 to 36 and 45 to 64 us. Alternatively the second transceivers 21 to 28, and 37 to 44 each use a different frequency range. This can e.g. be defined based on actual requirements during operation. If all are in the same frequency range, e.g. MMIMO or beamforming can be done with all 64 transceivers commonly. In the second case, two independent MMIMO or beamforming systems may be implemented in one antenna array.

Afterwards step 502 is executed.

In step 506, all first transceivers 1 to 20, 29 to 36 and 45 to 64 operate within the first bandwidth, in particular within 60 MHz as the first bandwidth. All second transceivers 21 to 28, and 37 to 44 are operated within the second bandwidth, in particular within 200 MHz. One or more second transceivers 21 to 28, and 37 to 44 may temporarily operate within the first bandwidth, in particular within 60 MHz as well.

After step 506, either a step 508 or a step 510 is executed. Whether step 508 or step 510 is executed depends in the example on a criterion related to the performance of the wireless access system. The criterion relates for example to an optimal average data throughput for each of the plurality of wireless terminals.

In step 508, all second transceivers 21 to 28, and 37 to 44 are operated within the second bandwidth, in particular within 200 MHz, and exclusively for wireless terminals if the information about the data rate demand for these wireless terminals meets a requirement and condition respectively. In the example, the condition is met, if the data rate demand for these wireless terminals is above the threshold. Exceeding this threshold does not necessarily mean that all second bandwidth transceivers are directly commonly configured for maximum bandwidth, based on the actual data rate requirements, etc. only some of the second bandwidth transceivers may use higher bandwidth and some of them can stay with the lower bandwidth. Another decision could be which frequency bands within the second bandwidth is used (e.g. availability, etc.).

In the example of FIG. 4, wireless terminals 303', 305' that have high data rate demand, are assigned to the second transceivers 21 to 28, and 37 to 44 exclusively. According to this example the second transceivers 21 to 28, and 37 to 44 control the beamforming radio communication within the second bandwidth of 200 MHz with these wireless terminal 303', 305'. It's not mandatory that beamforming is deployed and controlled. If MMIMO operation is beneficial, especially in none-line-of-sight communication, MMIMO operation may be applied.

In this example several wireless terminals 301, 302, 304, 306, 307 requiring low-to-medium data rate have to be served, as well as the two wireless terminals 303', 305' requiring very high data rates and thus high signal bandwidth. The connectivity between the wireless terminals and the antenna array 102 could be either by MMIMO and thus based on reflections also supporting non-line-of-sight, or by beamforming and thus direct line-of-side, or a mixture of the two, if required.

After step 508, step 502 is executed.

In step 510, all transceivers 1 to 64 are operated to serve all of the wireless terminals within the first bandwidth. Additionally the second transceivers 21 to 28, and 37 to 44 are operated to serve the wireless terminals that have the high data rate demand within the second bandwidth.

At least one transceiver of the plurality of transceivers 1, . . . , 64 may be selected for operation within the second bandwidth depending on a connectivity parameter. The connectivity parameter may for example be indicative of a line-of-sight or non-line-of-sight radio link for a radio communication with a wireless terminal of the plurality of wireless terminals. In particular beamforming may be used for line-of-sight communication if the connectivity parameter indicates that line-of-sight communication is beneficial. Alternatively, the connectivity parameter may indicate that MMIMO brings benefit compared to beamforming or vice-versa. For example this way in line-of-sight if beneficial, wireless terminals may be served by several or all antennas in massive MIMO operation.

After step 510, step 502 is executed.

This flexible MMIMO system is capable of supporting high data rate connectivity to individual users for example for access or fronthauling of e.g. small cells when needed, with the benefit of reduced cost and complexity compared with a generic and homogenous MMIMO system fully equipped with more complex and more costly high bandwidth transceivers. Temporally selecting the bandwidth, depending on the current data rate demand of the users, can be done in this flexible MMIMO system on the field by flexible bandwidth control of the second transceivers 21 to 28, and 37 to 44. Bandwidth related power amplifier supply voltage control and thus power savings, can be adopted in order to improve the energy efficiency as well. While an exemplary method of selecting the bandwidth and sets of antenna has been described above, the skilled person will readily recognize that the flexible MMIMO system is capable of operating with different ways of selecting bandwidth and/or antenna sets as well.

Furthermore, the system could be equipped with even more than only two different kinds of transceivers with different maximum bandwidth. In particular very compact, low complexity and low cost transceivers for speech transmission only or internet of things communication may be used additionally.

Also, an arrangement of the transceivers with different bandwidth capabilities is flexible and may be chosen related to the specific applications. A corresponding method of equipping an antenna array comprises arranging a plurality of transceivers for operation with the antenna array, wherein first transceivers operable within a first bandwidth and second transceivers operable within a plurality of bandwidths are arranged heterogeneously. For an urban application with timely hot spots, e.g. more high bandwidth transceivers are used compared to rural applications, where less high data rate demand can be expected. Also the geometrical configuration and positioning of the low bandwidth and high bandwidth transceivers to each other can vary and be configured before deployment e.g. based on application specific requirements.

The aforementioned 60 MHz bandwidth and the 200 MHz bandwidth are exemplary hardware defined maximum bandwidth capabilities of the respective transceivers. The antenna array is preferably only arranged with a few of the second transceivers that are capable of up to 200 MHz, because they are more complex and costly. Within this maximum frequency bandwidth, the system can operate with signals with flexible signal bandwidth. For example, when the first transceivers or the second transceivers are operated within the 60 MHz bandwidth, a carrier of only 20 MHz may be operated if this is enough for serving the wireless terminals. The same is valid for the second transceivers, when operating within the 200 MHz bandwidth. Despite the maximum bandwidth given by the hardware bandwidth limitations a flexible signal bandwidth can be achieved during operation within these limits, depending on the needs.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks, may be provided through the use of dedicated hardware as well as hardware, e.g. processors capable of executing software in association with appropriate software. When provided by a processor, the functions may be provided by a single dedicated processor, by a single shared processor, or by a plurality of individual processors, some of which may be shared. Moreover, explicit use of the term 'processor' or 'controller' should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the invention. Similarly, it will be appreciated that any sequence diagrams represent various processes which may be substantially represented in computer readable medium and so executed by a computer or processor, whether or not such computer or processor is explicitly shown.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. A method of operating a multi antenna system comprising a plurality of transceivers arranged as an antenna array to provide radio communication with a plurality of wireless terminals, the method comprising:
   providing radio communication via a first transceiver which is limited by internal hardware for communication operation within a single first bandwidth, wherein the single first bandwidth is fixed during transceiver design and realization;
   providing radio communication via a second transceiver designed for communication operation within a second bandwidth selectable from a plurality of bandwidths; and
   operating, depending on a data rate demand, either the first transceiver or the second transceiver or both for radio communication.

2. The method according to claim 1, wherein information about the data rate demand is determined or analyzed for a wireless terminal, and either the first transceiver or the second transceiver is or both are operatively selected for the radio communication with the wireless terminal depending on the information about the data rate demand.

3. The method according to claim 1, wherein the single first bandwidth is equal to or narrower than one of a group of bandwidths comprising 20 MHz, 50 MHz, and 60 MHz, and the second bandwidth is equal to or less narrower than one of the a group of bandwidths comprising 10 MHz, 20 MHz, 50 MHz, 60 MHz, 100 MHz, 150 MHz, and 200 MHz.

4. The method according to claim 1, wherein at least two transceivers of the plurality of transceivers operate to control a beamforming for the radio communication.

5. The method according to claim 4, wherein the beamforming for the radio communication is controlled within the second bandwidth with a wireless terminal or a relay device, if the information about the data rate demand for the wireless terminal or a group of wireless terminals meets a requirement condition.

6. The method according to claim 1, wherein at least one transceiver of the plurality of transceivers selectively operates for the radio communication within the single first bandwidth with a first adjustable supply voltage for a power amplifier of the at least one transceiver, or for the radio communication within the second bandwidth with a second adjustable supply voltage for the power amplifier.

7. The method according to claim 1, wherein at least one transceiver of the plurality of transceivers is selected for operation within the second bandwidth depending on a connectivity parameter.

8. The method according to claim 1, wherein the second transceiver operates temporarily for the radio communication within the single first bandwidth.

9. The method according to claim 1, wherein the antenna array, comprising the plurality of transceivers and a controller for the plurality of transceivers, operates as a massive multiple input multiple output system within a common bandwidth.

10. The method of claim 1, wherein the operating the transceivers occurs during at least partially overlapping time intervals.

11. A multi antenna system, comprising a plurality of transceivers arranged as an antenna array to provide radio communication with a plurality of wireless terminals, comprising:
    a first transceiver adapted to provide radio communication within a single first bandwidth, wherein the first transceiver is limited by internal hardware for communication operation within the single first bandwidth which is fixed during transceiver design and realization;
    a second transceiver adapted to provide radio communication within a second bandwidth selectable from a plurality of bandwidths; and
    a radio controller adapted to operate, depending on a data rate demand, either the first transceiver or the second transceiver or both for radio communication.

12. The multi antenna system of claim 11, wherein the radio controller is adapted to determine or analyze information about the data rate demand for a wireless terminal, and to operatively select either the single first transceiver or the second transceiver or both for the radio communication with the wireless terminal depending on the information about the data rate demand.

13. The multi antenna system of claim 11, wherein the radio controller is adapted to operate with the single first bandwidth being equal to or narrower than one of a group of bandwidths comprising 20 MHz, 50 MHz, and 60 MHz and with the second bandwidth being equal to or mom narrower than one of the a group of bandwidths comprising 10 MHz, 20 MHz, 50 MHz, 60 MHz, 100 MHz, 150 MHz, and 200 MHz.

14. The multi antenna system of claim 11, wherein the radio controller is adapted to operate at least two transceivers of the plurality of transceivers to control a beamforming for the radio communication.

15. The multi antenna system of claim 14, wherein the radio controller is adapted to control the beamforming for the radio communication within the second bandwidth with a wireless terminal of the plurality of wireless terminals or a relay device, if the information about the data rate demand for the wireless terminal or a group of wireless terminals meets a requirement condition.

16. The multi antenna system of claim 11, operable to adapt a supply voltage to power amplifier of the different transceivers depending on a currently transmitted carrier bandwidth.

17. The multi antenna system of claim 11, wherein the radio controller is adapted to select at least one transceiver of the plurality of transceivers for operation within the second bandwidth depending on a connectivity parameter.

18. The multi antenna system of claim 11, wherein the second transceiver is adapted to operate temporarily for the radio communication within the single first bandwidth.

19. The multi antenna system of claim 11, wherein the antenna array, comprising the plurality of transceivers and the radio controller, is arranged as a massive multiple input multiple output system within a common bandwidth.

20. The multi antenna system of claim 11, wherein the first bandwidth is a narrower bandwidth than the second bandwidth and the second bandwidth is a wider bandwidth than the first bandwidth.

* * * * *